United States Patent

Sommer

[15] 3,686,962
[45] Aug. 29, 1972

[54] SPEED REDUCER AND MOTION TRANSLATOR

[72] Inventor: Warren T. Sommer, 601 Orleans, Detroit, Mich. 48207

[22] Filed: Oct. 5, 1970

[21] Appl. No.: 77,830

[52] U.S. Cl. ................................... 74/25, 74/190
[51] Int. Cl. ................................... F16h 21/16
[58] Field of Search .......... 74/190, 204, 215, 25, 203, 74/204, 206

[56] References Cited

UNITED STATES PATENTS

| | | | |
|---|---|---|---|
| 2,602,338 | 7/1952 | Opocensky et al. | 74/198 |
| 1,715,637 | 6/1929 | Brandstetter | 74/204 |
| 2,461,258 | 2/1949 | Brooks | 74/193 |
| 3,400,599 | 9/1968 | Samuta | 74/194 |
| 3,424,012 | 1/1969 | Hirmann | 74/25 |
| 3,475,972 | 11/1969 | Steibel | 74/25 |
| 3,572,136 | 3/1971 | Stanley | 74/25 |
| 2,940,322 | 6/1960 | Uhing | 74/25 |
| 2,602,339 | 7/1952 | Moen | 74/206 |
| 2,732,724 | 1/1956 | Tateishi | 74/206 |
| 2,912,868 | 11/1959 | Preskitt | 74/25 |
| 3,199,371 | 8/1965 | Lins et al. | 74/664 |

FOREIGN PATENTS OR APPLICATIONS

769,076  2/1957  Great Britain ............... 74/215

Primary Examiner—William F. O'Dea
Assistant Examiner—Wesley S. Ratliff, Jr.
Attorney—Raymond E. Scott

[57] ABSTRACT

This disclosure relates to a power transmitting device which serves as a special application speed reducer and may be utilized as a motion translator, converting rotary to linear motion for example. The device includes a movable driven member, a bearing member having a surface generally parallel to a surface of the driven member and adapted to move in unison therewith, and a generally cylindrical drive member disposed between the parallel surfaces of the bearing and driven members and in bearing contact therewith. In the disclosed device, the coefficient of friction of the members are chosen such that the drive means frictionally grips the driven member and slips against the bearing member to cause the members to move in unison. Where the surfaces are generally flat, for example, the rotational movement of the drive means is converted to linear movement, however relatively complex motions are also easily produced by the disclosed device.

13 Claims, 7 Drawing Figures

Patented Aug. 29, 1972
3,686,962
2 Sheets-Sheet 1
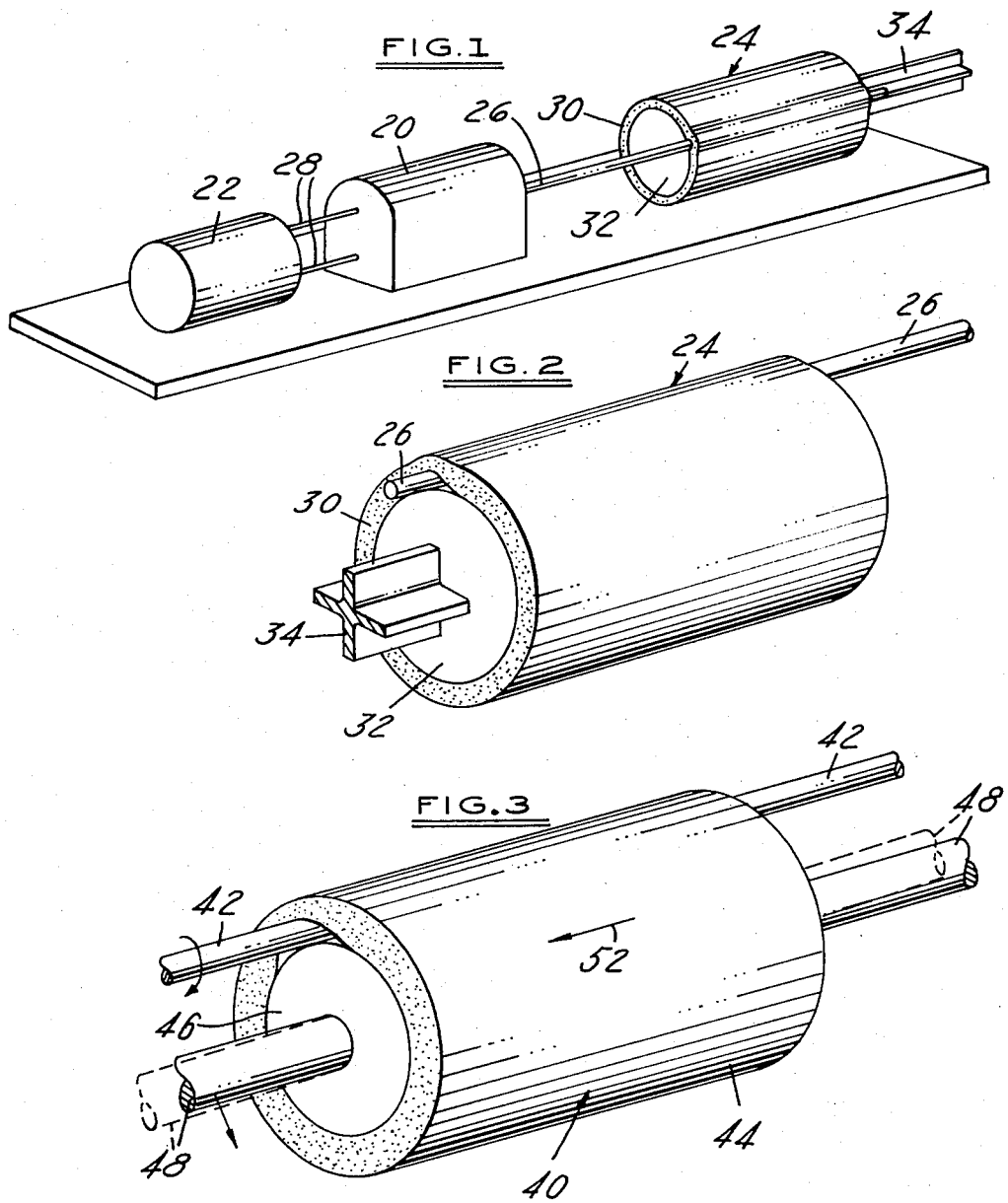
INVENTOR
Warren T. Sommer
BY Raymond Elliott
ATTORNEY Patented Aug. 29, 1972
3,686,962
2 Sheets-Sheet 2
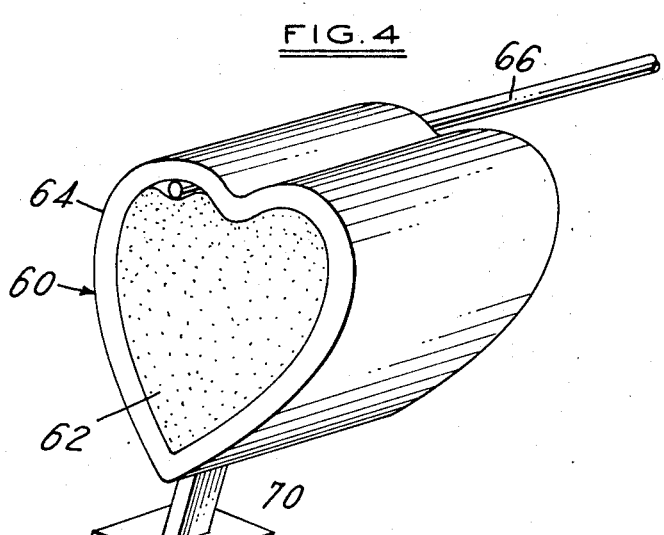
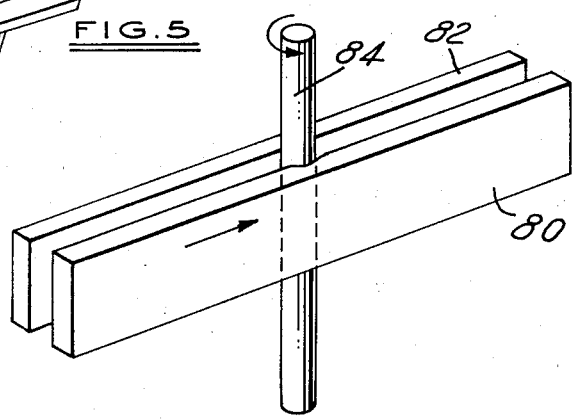
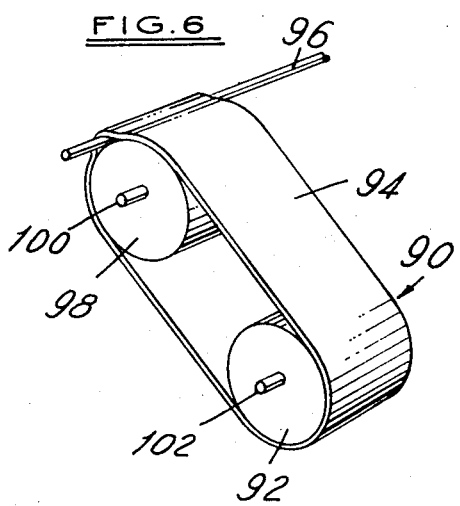
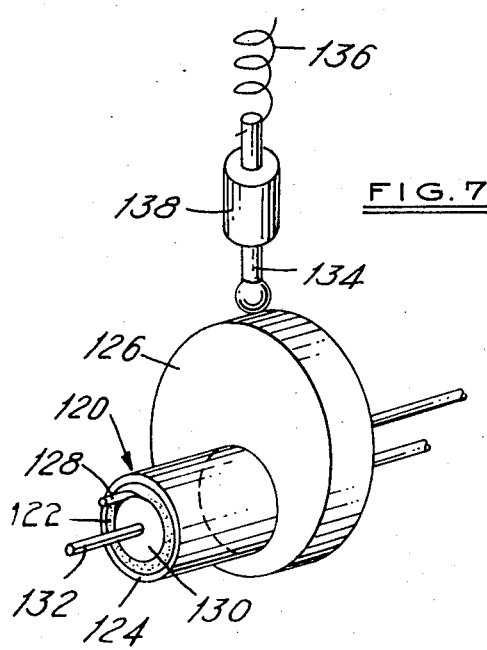
INVENTOR
Warren T. Sommer
BY Raymond E. Scott
ATTORNEY

SPEED REDUCER AND MOTION TRANSLATOR

DESCRIPTION OF THE PRIOR ART

Frictional drive mechanisms and couplings have been disclosed by the prior art, however these devices generally provide a friction coupling wherein a one-to-one power transmission is preferred. Friction couplings are also utilized in braking devices wherein the friction provides a gradual speed reduction. Examples of these devices include the following United States patents:
2,912,868
2,932,785
3,199,371.

In many mechanical devices, such as motorized toys and display devices, power is supplied to the device by a relatively high speed electric motor, because such motors are inexpensive and relatively small. Such devices are however generally designed to operate at a slower speed than the power input and the final motion may be complicated and irregular. The speed reduction and motion translation is normally achieved by gears, cams, pulleys and the like which are subject to failure and which may add substantial cost to the device. It is an object of the present invention to provide a relatively inexpensive motion translator and speed reducer which is more versatile than any known device.

SUMMARY OF THE INVENTION

The speed reducer and motion translator of this invention includes a driven member, a bearing member having a surface generally parallel to a surface of the driven member, and a generally cylindrical drive member disposed between the parallel surfaces of the bearing and driven members, in bearing contact therewith. The terms surface and surfaces are used herein in the broad sense, and include edge contacts. The drive member of the device is adapted to slip against the bearing member, but grip the driven member, such that the bearing and driven members will move in unison, as the drive member is rotated thereagainst, if they are restrained from relative movement. In the disclosed embodiments of the invention, the material of the members are chosen such that the drive member will frictionally grip the driven member and slip against the bearing member. I have also found it preferable to utilize a resilient material for the driven member, such that the driven member is resiliently deformed as the drive member is rotated thereagainst.

The disclosed embodiments of the invention include a cylindrical speed reducer, wherein the drive member is received between an outer annular member and a concentric cylindrical member, causing the members to rotate in the direction of the drive member, but at a slower speed. Another embodiment includes a bearing member and driven member having generally linear surfaces, wherein the rotary motion of the drive member is converted or translated to linear motion. It is also possible to produce relatively complex motions, as shown by another embodiment of the invention wherein the parallel surfaces include concave and convex portions. It can be seen that the speed reducer and motion translator of this invention is relatively simple, but is quite versatile, and may be utilized to produce a variety of motions.

Other advantages and meritorious features of this invention will more fully appear from the following descriptions, claims, and accompanying drawings.

BRIEF DESCRIPTION OF THE DRAWINGS

FIG. 1 is a side elevation of a battery operated power transmission assembly utilizing the invention as a speed reducer;

FIG. 2 is a side elevation of the embodiment of the speed reducer shown in FIG. 1;

FIG. 3 is a side elevation of another embodiment of the invention;

FIG. 4 is a side elevation of another embodiment of the invention, utilized as a motion translator;

FIG. 5 is a side elevation of another embodiment of the invention utilized as a motion translator;

FIG. 6 is a top elevation of another embodiment of the invention utilized to drive an endless belt; and FIG. 7 is a side elevation of another embodiment of the invention utilized in a cam assembly.

DESCRIPTION OF THE PREFERRED EMBODIMENTS

The power transmission assembly shown in FIG. 1 includes an electric motor 20 powered by a battery 22, which drives the speed reducer of this invention, indicated generally at 24 and shown in FIG. 2. The motor may be a conventional high speed motor, such as used on battery powered toys and display devices. The motor includes a drive shaft 26 and is electrically connected to the battery by wires or leads 28. The battery may be a conventional flashlight battery, for example.

This embodiment of the speed reducer of this invention is a friction drive unit wherein the motor drive shaft 26 is received between the resilient annular driven member 30 and the cylindrical bearing member 32, in bearing engagement therewith. The coefficient of friction of the members, in this embodiment, are chosen such that the drive member or shaft 26 frictionally grips the surface of the annular driven member 30 and slips against the bearing member 32. The resilient deformation of the driven member 30 aids in gripping the drive shaft by increasing the contact area and, in this embodiment, the resiliency of the driven member also causes the driven and bearing members to move or rotate in unison when the drive shaft is rotated. A suitable material for the driven member is rubber or synthetic rubber, for example, and Teflon or other friction resistant material may be used for the bearing member. Various plastic or metal materials may be used for the drive shaft which may be relatively rigid or flexible. It will be understood however that various materials may be utilized for the components of the disclosed embodiments of the invention, provided the drive shaft grips the driven member and slips against the bearing member. It may even be possible to provide mating teeth on the drive shaft and driven member.

Rotation of the drive shaft 26 causes the driven member 30 to rotate in the same direction as the drive shaft, but at a substantially slower rate due to the difference in diameters of the drive shaft and driven member. The resilient driven member closely conforms to external surface of the bearing member and frictionally retains the bearing member due to the substantially larger contact area, causing the bearing member to rotate in unison therewith. The driven member in this embodiment is provided with a cross-shaped gear extension 34 which may be utilized to driven another member, not shown, such as a mechanized toy or display device. The gear extension is adapted to be received within the device driven by the speed reducer and supports the speed reducer assembly.

The embodiment of the invention shown in FIG. 3 is a motor reducer and motion translator, wherein the device 40 is adapted to move linearly along the rotatable drive member or shaft 42. The device is substantially the same as the speed reducer 24 shown in FIG. 2 and includes a resilient annular driven member 44, and a cylindrical bearing member 46. The bearing member includes a cylindrical extension or shaft 48, which may be integral with the bearing member or a separate shaft. In this embodiment, the drive shaft 42 and shaft 48 extend beyond both ends of the device 40. Rotation of the drive shaft causes the driven member and bearing member to rotate in the same direction as the drive shaft, at a slower rate, as described above. The device is caused to move linearly on the drive shaft by applying a force to one end of the shaft 48, as illustrated schematically by arrow 50 in FIG. 3. The force, which in this embodiment is generally perpendicular to the axis of the shaft 48, tends to skew the driven member on the drive shaft, as shown in phantom, causing the device to move linearly in the direction of arrow 52. The linear motion may be reversed merely by applying a similar force to the opposite end of the shaft or reversing the direction of rotation of the drive shaft. The same result may also be obtained by designing the device such that the drive shaft and the engaging surfaces of the members are angularly related, similar to turning a rotating wheel on a surface. For example, the bearing member may define a hyperbola of revolution, wherein the diameter is greater at the ends than the midportion, and the external driven member closely conforms thereto and is resiliently deformed by the driven shaft which is rotatably received between the opposed surfaces of the members. In this embodiment, the device will move linearly as it rotates without requiring an additional external force.

The embodiment of the device 60 shown in FIG. 4 is a motion translator, and is shown primarily to illustrate the relatively complex motions which may be achieved with the device of this invention. In this embodiment, the internal member 62 is preferably the resilient driven member and the bearing member 64 is the external member. The driven and bearing members may also be reversed in the embodiment shown in FIG. 1, for example, without changing the operation of the device. The rotatable drive shaft 66 is received between the opposed generally parallel surfaces of the driven and bearing members and is resiliently urged against the bearing member 64 by the resiliently deformable driven member 62. This embodiment of the invention utilizes a connecting rod 68 to support and orientate the members, rather than an axial shaft, which is movably received in a bearing member 70. Rotation of the drive shaft 66, which in this embodiment has a fixed axis of rotation, causes the driven and bearing members to shift in the direction of rotation, such that the members shift horizontally and vertically on the drive shaft. The connecting rod 68 follows the motion of the members in the bearing, defining a heart-shaped motion.

The embodiment of the motion translator shown in FIG. 5 is adapted to shift the driven member 80 and bearing member 82 linearly in response to rotation of the drive shaft 84. The operation of the device is substantially as described above, wherein the drive shaft frictionally grips the resiliently deformable driven member 80, causing the driven member to shift in the direction of rotation of the drive shaft. The driven shaft is resiliently urged against the bearing member by the driven member, which must be fixed in relation to the driven member, such that the members shift linearly in unison. The driven member slips against the bearing member as described above. The members may be fixed relative to each other by a securement at the ends or a pair of magnets, not shown, may be secured to the members adapted to continually urge the members together.

The embodiment of the speed reducer and motion translator 90 shown in FIG. 6 is adapted to drive a rotatable drum or pulley 92. The driven member 94 in this embodiment is a resilient flexible belt 94 which is received over the rotatable drive shaft 96 and the driven member 98. The driven member 98 is rotatably supported on shaft 100 and the pulley 92 is rotatably supported on shaft 102. The drive shaft 96 frictionally grips the resilient belt 94 to shift the belt in the direction of rotation of the drive shaft, as described above. The cylindrical bearing member and pulley are thus caused to rotate as described above. The device functions substantially as described above, however FIG. 6 illustrates another use for the speed reducer and motion translator of this invention.

The speed reducer and motion translator shown in FIG. 7 functions as a variable speed cam and may be utilized to actuate various devices including switching mechanisms. In this embodiment, the driven member indicated generally at 120 includes a resilient layer 122, such as synthetic rubber, and a relatively rigid layer 124 which supports the integral cam portion 126. A rotatable drive member is received between the resiliently deformable layer 122 of the driven member and the cylindrical bearing member 130. The device is supported in this embodiment on a central shaft 132. A bearing member 134 is continually urged against the cam portion 126 of the device by a spring 136 and is adapted to move linearly within a conventional bearing 138. It can be seen from FIG. 7 that the loading of the cam portion by the bearing member 134 will vary according to the position of the cam and will be greatest when the cam is in the position shown in FIG. 7.

In each of the disclosed embodiments of the invention, there is a predetermined energy loss proportional to the deformation of the driven member, however this energy loss has been minimized in the cam assembly shown in FIG. 7. In this embodiment the energy loss is maximum at the cam position shown, wherein the bearing 134 exerts the greatest pressure against the cam 126, which deforms the resilient layer 122 of the driven member. The energy loss is however reduced as the cam portion 126 rotates, because the bearing 134 is spring biased against the cam, resulting in a more efficient operation.

It can be seen from the embodiments of the invention described hereinabove that relatively complex motions may be generated by the speed reducer and motion translator of this invention although the translator mechanism is relatively simple. An important feature of the motion translator device described hereinabove is that the drive shaft is relatively small compared to the driven and bearing members, permitting the drive member to follow the configuration of the driven and bearing members. It is also important to note that because of the support provided by the bearing surface, the rotating drive member does not have to transmit bending forces along its length normally required to maintain contacts between the elements of a drive mechanism. The rotating drive member may therefore be thinner and more flexible than is normally required.

What is claimed is:

1. A device of the character described, comprising: a movable bearing member, a driven member operably attached to said bearing member and adapted to move in unison therewith and having a surface generally parallel to an opposed surface of the bearing member, one of said members being resiliently deformable with its surface having a relatively high coefficient of friction, the surface of the opposed member having a relatively low coefficient of friction, and a rotatable, generally cylindrical drive means disposed between said parallel surfaces of the members in bearing engagement with said surfaces and resiliently deforming said one of said members, said drive means adapted to grip the engaging surface of said one of said members and slip against the surface of said opposed member to drive said members in unison when said drive means is rotated.

2. The invention defined in claim 1, characterized in that one of said members has a generally cylindrical surface and the other member has an opposed, generally concentric, parallel cylindrical surface.

3. The invention defined in claim 1, characterized in that one of said members is annular, the other member is generally cylindrical and received within the annular member, and said drive means is disposed between the opposed cylindrical surfaces of said members in bearing contact therewith.

4. The invention defined in claim 3, characterized in that the distance between the opposed parallel surfaces of said members is normally less than the diameter of said drive means, compressing said drive means between said opposed surfaces.

5. The invention defined in claim 1, characterized in that the parallel surfaces of said members are generally linear, converting the rotational motion of said drive means to a linear motion of said members, and a retention means adapted to cause the members to move in unison.

6. The invention defined in claim 1, characterized in that said driven member has a greater coefficient of friction than sad bearing member, causing the drive means to frictionally grip said driven member and slip against said bearing member.

7. The invention defined in claim 6, characterized in that said driven member is resiliently deformable and the distance between the opposed surfaces of said members, in their relaxed state, is less than the diameter of said drive means.

8. A speed reducer unit, comprising: A resilient movable driven member, a relatively rigid movable bearing member having a surface generally parallel to a surface of the driven member and adapted to move in unison therwith, and a rotatable, generally cylindrical drive member disposed between said generally parallel surfaces of said driven and bearing members in bearing contact therewith and resiliently deforming said driven member, said bearing member surface having a relatively low coefficient of friction, compared to said driving and driven members, such that said driving member slips against said bearing member and frictionally grips said driven member to shift said driven and bearing members in unison.

9. The speed reducer unit defined in claim 8, characterized in that the resiliency of said driven member biases said driving member against the bearing member and retains the driving member in said bearing contact.

10. The speed reducer unit defined in claim 8, characterized in that the diameter of said driving member is relatively small compared to the width of said parallel surfaces.

11. The speed reducer unit defined in claim 8, characterized in that the parallel surfaces of said driven and bearing members are generally cylindrical.

12. The speed reducer unit defined in claim 11, characterized in that said driven member is generally cylindrical and said bearing member is annular and receives said driven member therein.

13. The speed reducer unit defined in claim 8, characterized in that said generally parallel surfaces include convex and concave portions.

* * * * *

UNITED STATES PATENT OFFICE
CERTIFICATE OF CORRECTION

Patent No. 3,686,962　　　　　　　　Dated August 29, 1972

Inventor(s) Warren T. Sommer

It is certified that error appears in the above-identified patent and that said Letters Patent are hereby corrected as shown below:

On the cover sheet (72) "601 Orleans, Detroit, Mich. 48207" should read -- 17130 Sunset, Detroit, Mich. 48212 --.

Signed and sealed this 15th day of May 1973.

(SEAL)
Attest:

EDWARD M. FLETCHER, JR.　　　　　　ROBERT GOTTSCHALK
Attesting Officer　　　　　　　　　Commissioner of Patents

FORM PO-1050 (10-69)